UNITED STATES PATENT OFFICE.

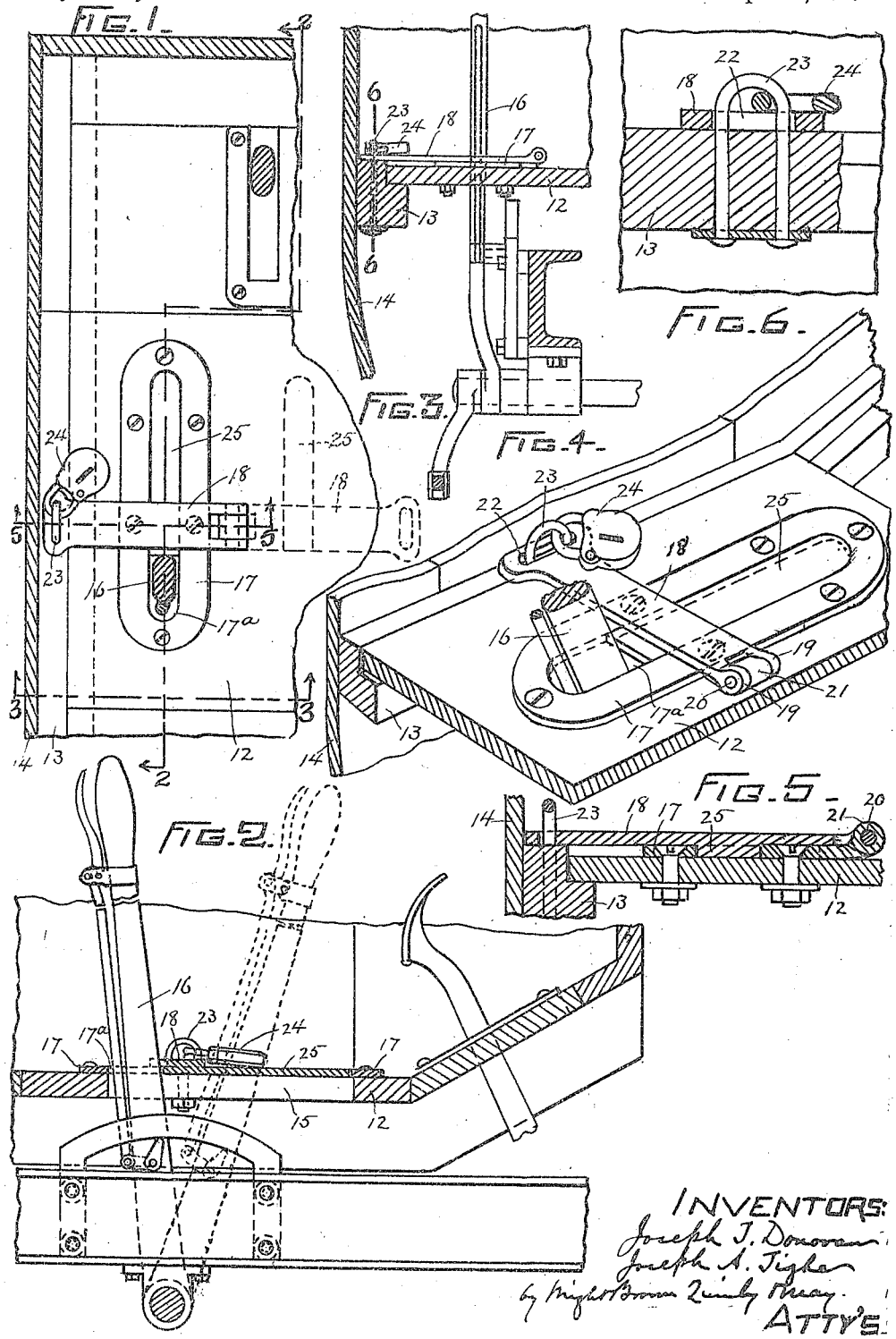

JOSEPH T. DONOVAN AND JOSEPH A. TIGHE, OF BOSTON, MASSACHUSETTS.

LEVER-LOCKING MEANS FOR MOTOR-VEHICLES.

1,222,085.   Specification of Letters Patent.   Patented Apr. 10, 1917.

Application filed December 7, 1916. Serial No. 135,594.

*To all whom it may concern:*

Be it known that we, JOSEPH T. DONOVAN and JOSEPH A. TIGHE, citizens of the United States, residing at Boston, in the county of Suffolk and State of Massachusetts, have invented new and useful Improvements in Lever-Locking Means for Motor-Vehicles, of which the following is a specification.

This invention relates to a motor vehicle, a portion or section of the body floor of which is normally loose and removable or displaceable and constitutes a cover for mechanism below the floor, said mechanism being accessible when said cover is displaced. The said floor section or cover is slotted to receive and permit oscillating movements of an emergency brake lever which extends upwardly through the floor section.

The object of the invention is to provide means for simultaneously locking said floor section to the body and confining the lever against movement in said slot from its operative position, so that when the brake-lever is adjusted to brake and prevent operation of the vehicle, it cannot be fraudulently moved to its inoperative position, without resort to methods liable to attract so much attention and consume so much time as to defeat, under ordinary circumstances, the fraudulent intent.

The invention is embodied in the improvements which we will now proceed to describe and claim.

Of the accompanying drawings, forming a part of this specification,—

Figure 1 represents a top plan view of a portion of the floor of the motor vehicle body, portions of the wall thereof being shown in section.

Fig. 2 represents a section on line 2—2 of Fig. 1.

Fig. 3 represents a section on line 3—3 of Fig. 1.

Fig. 4 represents a fragmentary perspective view, illustrating parts shown by Fig. 1.

Fig. 5 represents a section on line 5—5 of Fig. 1.

Fig. 6 represents a section on line 6—6 of Fig. 3.

The same reference characters indicate the same or similar parts in all the figures.

In the drawings, 12 represents the removable portion or section of the floor of a motor vehicle body, said section being loosely supported by suitable means, preferably including a rabbeted flange or sill 13 attached to one of the sides 14 of the body, the outer edge of the floor section 12 resting on said sill, as shown by Figs. 3, 4 and 5. The inner edge of the section 12 is similarly supported, the said section normally resting loosely on its supports, so that it constitutes a freely removable cover for mechanism below the floor to which convenient access is desirable.

The section 12 contains the usual slot 15 (Fig. 2), through which the usual emergency brake-lever 16 extends, and in which said lever is adapted to oscillate.

17 represents a slotted face-plate, attached by screws or bolts to the section 12 and surrounding the slot therein, said face-plate having a slot 17ª which registers with the slot 15.

18 represents a hasp, one end of which is provided with hinge members 19 connected by a pintle 20 with a hinge member 21 formed on the face-plate 17. The hasp is formed to extend across the face-plate, as indicated by Figs. 1 and 4, and is provided at its outer end with a slot 22 which overlaps the sill 13 when the hasp is in its operative position.

23 represents a member, preferably a staple, inseparably secured to the vehicle body and preferably with the sill 13, the legs of the staple extending through the sill and being secured at the under side thereof, as indicated by Fig. 6.

The staple is so arranged that when the hasp is swung to its operative position, the staple will enter the hasp slot 22 and project above the same so that the staple and hasp may be locked together by separable locking connections, preferably embodied in a padlock 24.

The hasp is provided with a filling member 25 formed to substantially fill all portions of the slot therein, excepting the portion occupied by the lever 16 when said lever is in its operative position, indicated by Fig. 4 and by full lines in Fig. 2. The hasp and filling member are preferably formed in a single piece, which may be a malleable iron casting. The upper side of the filling member is flush with the upper side of the face-plate 17 when the hasp is in its operative position, so that the face-plate slot is sufficiently closed or obstructed by the filling member and the lever to prevent the insertion in the slot of a tampering instrumentality such as a prying tool, intended to raise the face-plate and the section 12.

It will be seen by reference to Figs. 2 and 4, that when the hasp 18 and filling member 25 are in their operative position, the lever 16 is confined at one end of its movement and cannot be removed therefrom. It will also be seen that when the hasp is locked to the member 23 the floor section 12 is also locked so that it cannot be removed without resorting to methods attracting attention and consuming considerable time.

When the hasp and filling member are not in use, they are swung backwardly upon the body floor, as indicated by dotted lines in Fig. 1, the floor section 12 being thus released so that it may be removed.

By an inseparable connection between the member 23 and the body, we mean a connection of such nature as to prevent relatively easy and quick separation of the member from the body, not involving violence, and therefore not liable to detection. The section 12 when locked as described, becomes a part or element of means for locking the lever in its operative position.

The filling member 25 is another element of the lever-locking means. If said member were not provided, a considerable portion of the slot in which the lever moves would be left open at the right of the hasp, (as viewed in Fig. 4), so that it would be possible to insert a burglar's jimmy or other effective prying tool in the slot, and thereby wrench the face plate 17 from the section 12, thus making it possible to easily split the latter and unlock the lever. The filling member occupying the greater part of the slot, and the lever occupying the remaining part, render the locking means practically burglar proof.

The filling member being rigidly attached to the hasp, is carried by the hasp to and from an operative position, and is adapted to lie with the hasp on the floor in an inoperative position, without inconvenience to the driver of the car. The filling member is therefore always ready for use, and cannot be removed from the hasp, and lost, without breaking it.

We claim:

1. In a motor vehicle which includes a body having a floor, and a controlling lever extending through and adapted to oscillate in a slot in said floor, the floor including a removable section containing said slot and constituting a cover for mechanism below the floor, the combination with said body, floor section, and lever, of a hasp having a hinge connection at one end with said section at one side of the slot, and formed at its swinging end to extend beyond the floor section and engage locking means on the body, a locking member inseparably connected with the body independently of said section at the opposite side of the slot, and adapted to engage the swinging end of said hasp, the hasp being adapted to extend across the slot and confine the lever in its operative position at one end of the slot, separable locking connections between said member and the swinging end of the hasp whereby both the hasp and the removable floor section may be simultaneously locked to the body, the said section, when locked, constituting an element of means for locking the lever in its operative position, and means carried by the hasp for obstructing the slot when the hasp is in its operative position.

2. In a motor vehicle which includes a body having a floor, and a controlling lever extending through and adapted to oscillate in a slot in said floor, the floor including a removable section containing said slot and constituting a cover for mechanism below the floor, the combination with said body, floor section, and lever, of a hasp having a hinge connection at one end with said section at one side of the slot, and formed at its swinging end to extend beyond the floor section and engage locking means on the body, a filling member attached to and extending crosswise of the hasp between its hinged and swinging ends, and formed to closely fit and fill the slot from one end thereof nearly to the opposite end, leaving sufficient space at the opposite end for occupancy by the lever when the latter is at one extreme of its movement, the filling member being carried by the hasp to and from its operative position, and adapted to lie with the hasp on the floor in an inoperative position, a locking member inseparably connected with the body independently of said section at the opposite side of the slot, and adapted to engage the swinging end of said hasp, the hasp being adapted to extend across the slot and confine the lever in its operative position at one end of the slot, and separable locking connections between said member and the swinging end of the hasp whereby both the hasp and the removable floor section may be simultaneously locked to the body, the said section, when locked, constituting an element of means for locking the lever in its operative position, the filling member and lever so obstructing the slot when the hasp is locked that the insertion, in said slot, of an effective tampering instrumentality, is prevented.

In testimony whereof we have affixed our signatures.

JOSEPH T. DONOVAN.
JOSEPH A. TIGHE.